United States Patent
Li

(10) Patent No.: US 8,977,792 B2
(45) Date of Patent: Mar. 10, 2015

(54) AUDIO SIGNAL RECEIVING DEVICE, AUDIO SIGNAL ADAPTER DEVICE AND SYSTEM FOR TRANSMITTING AUDIO SIGNAL

(75) Inventor: Dongsheng Li, Beijing (CN)

(73) Assignee: Tendyron Corporation, Beijing (CN)

( * ) Notice: Subject to any disclaimer, the term of this patent is extended or adjusted under 35 U.S.C. 154(b) by 0 days.

(21) Appl. No.: 14/105,361

(22) PCT Filed: Jun. 15, 2012

(86) PCT No.: PCT/CN2012/077043
§ 371 (c)(1),
(2), (4) Date: Mar. 10, 2014

(87) PCT Pub. No.: WO2012/171497
PCT Pub. Date: Dec. 20, 2012

(65) Prior Publication Data
US 2014/0244867 A1    Aug. 28, 2014

(30) Foreign Application Priority Data

Jun. 15, 2011 (CN) .......................... 2011 1 0161129

(51) Int. Cl.
*G06F 3/00* (2006.01)
*G06F 13/38* (2006.01)
*G06F 3/16* (2006.01)
*H04R 1/10* (2006.01)

(52) U.S. Cl.
CPC .............. *G06F 3/162* (2013.01); *H04R 1/1091* (2013.01); *H04R 2420/03* (2013.01); *H04R 2420/09* (2013.01)

USPC ................... 710/72; 710/15; 710/62; 710/73; 709/227; 439/638

(58) Field of Classification Search
None
See application file for complete search history.

(56) References Cited

U.S. PATENT DOCUMENTS

| 5,912,964 | A | * | 6/1999 | Stelman ................... 379/390.01 |
| 7,937,109 | B2 | * | 5/2011 | Wilson .......................... 455/557 |
| 8,064,613 | B1 | * | 11/2011 | Helfrich .......................... 381/74 |
| 2004/0160993 | A1 | * | 8/2004 | Ganton et al. ................ 370/537 |
| 2008/0153351 | A1 | * | 6/2008 | Chung et al. .................. 439/607 |
| 2010/0169529 | A1 | * | 7/2010 | Hsu et al. ...................... 710/300 |
| 2013/0266154 | A1 | * | 10/2013 | McCormack et al. ........ 381/117 |

* cited by examiner

*Primary Examiner* — Michael Sun
(74) *Attorney, Agent, or Firm* — Maginot, Moore & Beck, LLP

(57) ABSTRACT

An audio signal adapter device, an audio signal receiving device and a system for transmitting an audio signal are provided. The audio signal adapter device comprises an audio interface and an adapter end interface. The audio interface is connected with an audio signal sending device, has a ground pin and at least one audio pin. The adapter end interface is connected with the audio signal receiving device, has an audio signal pin and a reference signal pin. The audio pin of the audio interface is configured to receive an audio signal output from the audio signal sending device, connected with the audio signal pin of the adapter end interface, the ground pin of the audio interface is connected with the reference signal pin of the adapter end interface. The audio signal pin and the reference signal pin are configured to output the audio signal to the audio signal receiving device.

13 Claims, 5 Drawing Sheets

AUDIO SIGNAL RECEIVING DEVICE, AUDIO SIGNAL ADAPTER DEVICE AND SYSTEM FOR TRANSMITTING AUDIO SIGNAL

FIELD

The present invention generally relates to an electronic technical field, and more particularly relates to an audio signal receiving device, an audio signal adapter device and a system for transmitting an audio signal.

BACKGROUND

With the development of an audio signal coding/decoding technology, more and more electronic equipments transmitting data via an audio interface are produced. For example, the electronic equipment may be connected with a mobile communication device (such as a mobile phone) via a loudspeaker interface (such as a headphone interface) of the mobile communication device for receiving an audio signal output from the mobile communication device.

Furthermore, with the popularization of a USB interface, a large number of electronic equipments are provided with the USB interface. Thus, how to transmit the audio signal between the mobile communication device and the electronic equipment via the loudspeaker interface of the mobile communication device and the USB interface of the electronic equipment is a problem which needs to be solved currently.

An adapter cable for connecting the loudspeaker interface and the USB interface (for example, the adapter cable for connecting a 3.5 mm headphone interface and the USB interface) in the prior art can only be connected with a USB master equipment (for example, a personal computer) and a loudspeaker interface equipment (for example, the mobile communication device), such that the loudspeaker interface equipment (for example, the mobile communication device) can communicate with the USB master equipment normally. However, the existing electronic equipments provided with the USB interface are generally USB slave equipments, which cannot communicate with the mobile communication device using the adapter cable for connecting the loudspeaker interface and the USB interface in the prior art.

SUMMARY

The present disclosure overcomes the defects of the prior art, and provides an audio signal adapter device which can be connected with a loudspeaker interface equipment and a USB slave equipment, and a audio signal receiving device corresponding to the loudspeaker interface equipment, and a system for transmitting an audio signal comprising the audio signal adapter device and the audio signal receiving device, which can realize an audio signal transmission between the loudspeaker interface equipment and the USB slave equipment (the audio signal receiving device).

The present disclosure provides a system for transmitting an audio signal. The system is configured to receive the audio signal output from an audio signal sending device and send a signal thereto, and the system comprises an audio signal adapter device and an audio signal receiving device.

The audio signal adapter device comprises an audio interface and a adapter end interface.

The audio interface is connected with the audio signal sending device and has a first ground pin and at least one audio pin.

The adapter end interface is connected with the audio signal receiving device and has a first audio signal pin and a first reference signal pin.

The at least one audio pin of the audio interface is connected with the first audio signal pin of the adapter end interface, and the first ground pin of the audio interface is connected with the first reference signal pin of the adapter end interface.

The audio signal receiving device comprises an audio receiving module and a receiving end interface.

The receiving end interface has a second audio signal pin and a second reference signal pin, the second audio signal pin of the receiving end interface is connected with the first audio signal pin of the adapter end interface, and the second reference signal pin of the receiving end interface is connected with the first reference signal pin of the adapter end interface.

The audio receiving module is connected with the second audio signal pin and the second reference signal pin of the receiving end interface respectively, and configured to receive the audio signal via the second audio signal pin and the second reference signal pin.

Furthermore, each of the adapter end interface and the receiving end interface is a USB interface.

The first audio signal pin is one of a D+ pin and a D− pin of the adapter end interface, and the first reference signal pin is the other one of the D+ pin and the D− pin of the adapter end interface. The second audio signal pin is one of a D+ pin and a D− pin of the receiving end interface, and the second reference signal pin is the other one of the D+ pin and the D− pin of the receiving end interface.

Furthermore, the audio interface of the audio signal adapter device further comprises a MIC pin, and the adapter end interface of the audio signal adapter device further comprises a second ground pin.

The MIC pin is connected with the second ground pin of the adapter end interface.

The audio signal receiving device further comprises a signal sending module.

The signal sending module is connected with the second reference signal pin and configured to output a signal to the audio signal sending device via the second reference signal pin and the MIC pin by changing a voltage of the second reference signal pin.

Furthermore, the signal sending module is further connected with the second audio signal pin, and configured to change a voltage of the second audio signal pin with an amount same as a change of the voltage of the second reference signal pin.

Furthermore, the signal sending module is further connected with a third ground pin of the receiving end interface, and configured to keep a voltage of the third ground pin at a fixed preset voltage when changing the voltage of the second reference signal pin.

Furthermore, the audio receiving module comprises a comparator.

A positive terminal of the comparator is connected with the second audio signal pin, a negative terminal of the comparator is connected with the second reference signal pin, and an output pin of the comparator is configured to output a square wave corresponding to an input audio signal; or the positive terminal of the comparator is connected with the second reference signal pin, the negative terminal of the comparator is connected with the second audio signal pin, and the output pin of the comparator is configured to output the square wave corresponding to the input audio signal.

Furthermore, the at least one audio pin of the audio interface of the audio signal adapter device comprises a left-channel pin and a right-channel pin.

The present disclosure further provides an audio signal adapter device. The audio signal adapter device comprises an audio interface and a adapter end interface.

The audio interface is connected with an audio signal sending device and has a first ground pin and at least one audio pin.

The adapter end interface is connected with the audio signal receiving device and has an audio signal pin and a reference signal pin.

The at least one audio pin of the audio interface is configured to receive an audio signal output from the audio signal sending device and connected with the audio signal pin of the adapter end interface, and the first ground pin of the audio interface is connected with the reference signal pin of the adapter end interface.

The audio signal pin and the reference signal pin are configured to output the audio signal to the audio signal receiving device connected therewith.

Furthermore, the adapter end interface is a USB interface.

The audio signal pin is one of a D+ pin and a D− pin of the adapter end interface, and the reference signal pin is the other one of the D+ pin and the D− pin of the adapter end interface.

Furthermore, the audio interface further comprises a MIC pin, and the adapter end interface further comprises a second ground pin.

The MIC pin is connected with the second ground pin.

Furthermore, the at least one audio pin of the audio interface comprises a left-channel pin and a right-channel pin.

The present disclosure further provides an audio signal receiving device. The audio signal receiving device comprises an audio receiving module and a receiving end interface.

The receiving end interface has an audio signal pin and a reference signal pin.

The audio receiving module is connected with the audio signal pin and the reference signal pin of the receiving end interface and configured to receive an audio signal via the audio signal pin and the reference signal pin.

Furthermore, the receiving end interface is a USB interface.

The audio signal pin is one of a D+ pin and a D− pin of the receiving end interface, and the reference signal pin is the other one of the D+ pin and the D− pin of the receiving end interface.

Furthermore, the audio signal receiving device further comprises a signal sending module.

The signal sending module is connected with the reference signal pin, and configured to output a signal to an audio signal sending device via the reference signal pin by changing a voltage of the reference signal pin.

Furthermore, the signal sending module is further connected with the audio signal pin, and configured to change a voltage of the audio signal pin with an amount same as a change of the voltage of the reference signal pin.

Furthermore, the signal sending module is further connected with a ground pin of the receiving end interface, and configured to keep a voltage of the ground pin at a fixed preset voltage when changing the voltage of the reference signal pin.

Furthermore, the audio receiving module comprises a comparator.

A positive terminal of the comparator is connected with a D+ pin of the receiving end interface, a negative terminal of the comparator is connected with a D− pin of the receiving end interface, and an output pin of the comparator is configured to output a square wave corresponding to the input audio signal; or the positive terminal of the comparator is connected with the second reference signal pin, the negative terminal of the comparator is connected with the second audio signal pin, and the output pin of the comparator is configured to output the square wave corresponding to an input audio signal.

In conclusion, the present disclosure realizes a signal transmission between the loudspeaker interface equipment and the electronic equipment provided with the USB interface (the audio signal receiving device) with a low hardware cost. When it is used in combination with the audio signal adapter device (e.g., an audio cable) of the present disclosure, the electronic equipment can receive the audio signal via the USB interface, without the need of being provided with a separate loudspeaker interface, thus reducing a cost of the electronic equipment and decreasing a size of the electronic equipment.

DETAILED DESCRIPTION

In the following, the present disclosure will be described in detail with reference to drawings and embodiments.

The audio signal adapter device in the present disclosure may be an audio cable, an audio adapter cable, or an audio adapter, et al.

First Embodiment

Figure 1:
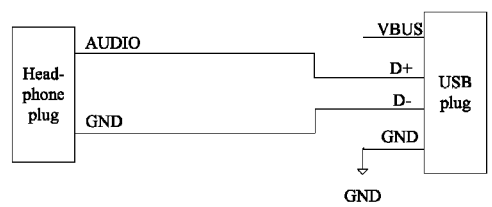
FIG. 1 is a schematic diagram of an audio signal adapter device according to a first embodiment of the present disclosure.

FIG. 1 is a schematic diagram of an audio signal adapter device according to a first embodiment of the present disclosure. As shown in FIG. 1, the audio signal adapter device comprises a loudspeaker interface (such as the headphone plug shown in FIG. 1) and a USB adapter interface (such as the USB plug shown in FIG. 1).

The headphone plug is configured to be connected with a headphone jack of an audio signal sending device (e.g., a mobile phone), and to receive an audio signal output from the audio signal sending device.

The headphone plug has an audio pin (such as the AUDIO pin shown in FIG. 1) and a ground pin.

The USB plug is configured to be connected with a USB socket of an audio signal receiving device and to output the audio signal to the audio signal receiving device.

The USB plug has a power pin (a VBUS pin), a D+ pin, a D− pin and a ground pin.

In this embodiment, the audio pin of the headphone plug is connected with the D+ pin of the USB plug, and the ground pin of the headphone plug is connected with the D− pin of the USB plug. In other words, in this embodiment, the audio signal adapter device uses the D+ pin of the USB plug as an audio signal pin and uses the D− pin as a reference signal pin, so as to output the audio signal to the audio signal receiving device.

When the audio signal adapter device according to the first embodiment of the present disclosure is connected with the electronic equipment (the audio signal receiving device), the headphone plug of the audio signal adapter device can be inserted into the headphone jack of the audio signal sending device (e.g., the mobile phone), the USB plug/socket of the audio signal adapter device is connected with the USB socket/plug of the electronic equipment, and the audio signal adapter device uses the D+ pin of the plug/socket (collectively referred to as the USB adapter interface) as the audio signal pin and uses the D− pin as the reference signal pin, so as to receive the audio signal output from the headphone jack of the audio signal sending device and to send the audio signal to the electronic equipment (the audio signal receiving device) connected with the audio signal adapter device.

Figure 2:
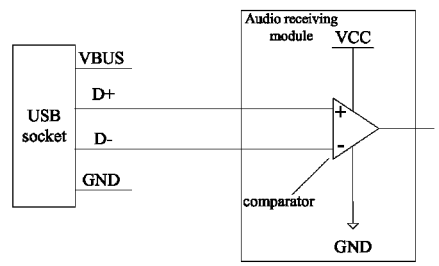
FIG. 2 is a schematic diagram of an audio signal receiving device according to the first embodiment of the present disclosure.

FIG. 2 is a schematic diagram of an audio signal receiving device according to the first embodiment of the present disclosure. As shown in FIG. 2, the audio signal receiving device comprises a USB interface (such as the USB socket shown in FIG. 2) and an audio receiving module.

The USB socket is configured to be connected with the USB plug of the audio signal adapter device, and to receive the audio signal output from the audio signal adapter device.

The USB socket has a power pin (VBUS pin), a D+ pin, a D− pin and a ground pin.

The audio receiving module is connected with the D+ pin and the D− pin of the USB socket respectively, and configured to use the D+ pin of the USB socket as an audio signal pin and use the D− pin as a reference signal pin, so as to receive the audio signal via the D+ pin and the D− pin.

In this embodiment, the audio receiving module comprises a comparator, a positive terminal of the comparator is connected with the D+ pin, a negative terminal of the comparator is connected with the D− pin, a ground pin of the comparator is grounded, a power pin of the comparator is connected with a power supply, and an output pin of the comparator is configured to output a square wave corresponding to the input audio signal.

Furthermore, alternatively, the positive terminal of the comparator may be connected with the D− pin, while the negative terminal of the comparator may be connected with the D+ pin.

The system for transmitting the audio signal according to the first embodiment of the present disclosure comprises the above audio signal adapter device and the above audio signal receiving device.

Second Embodiment

Figure 3:
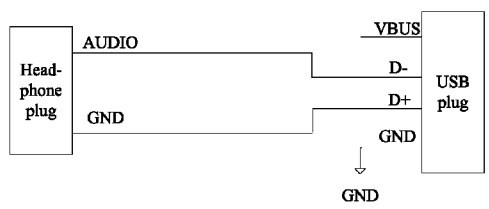
FIG. 3 is a schematic diagram of an audio signal adapter device according to a second embodiment of the present disclosure.

FIG. 3 is a schematic diagram of an audio signal adapter device according to the second embodiment of the present disclosure. As shown in FIG. 3, the differences between the audio signal adapter devices in the second embodiment and that in the first embodiment are as follows.

In the second embodiment, the audio signal adapter device uses the D− pin of the USB plug as the audio signal pin for connecting with the audio pin of the headphone plug, and uses the D+ pin of the USB plug as the reference signal pin for connecting with the ground pin of the headphone plug, so as to output the audio signal to the audio signal receiving device.

The audio signal receiving device in the second embodiment is the same as that in the first embodiment.

The system for transmitting the audio signal according to the second embodiment of the present disclosure comprises the above audio signal adapter device and the above audio signal receiving device.

Third Embodiment

Figure 4:
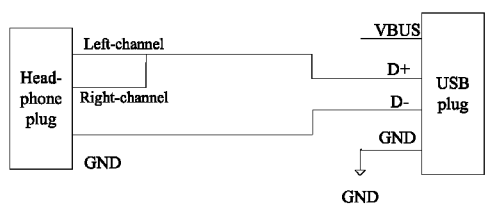
FIG. 4 is a schematic diagram of an audio signal adapter device according to a third embodiment of the present disclosure.

FIG. 4 is a schematic diagram of an audio signal adapter device according the third embodiment of the present disclosure. As shown in FIG. 4, the differences between the audio signal adapter devices in the third embodiment and that in the first embodiment are as follows.

The audio pin of the headphone plug comprises a left-channel pin and a right-channel pin. Both the left-channel pin and the right-channel pin are connected with the D+ pin (the audio signal pin) of the USB plug.

The audio signal receiving device in the third embodiment is the same as that in the first embodiment.

The system for transmitting the audio signal according to the third embodiment of the present disclosure comprises the above audio signal adapter device and the above audio signal receiving device.

Fourth Embodiment

Figure 5:
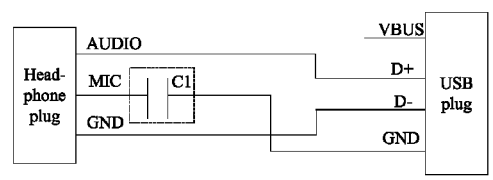
FIG. 5 is a schematic diagram of an audio signal adapter device according to a fourth embodiment of the present disclosure.

FIG. 5 is a schematic diagram of an audio signal adapter device according to a fourth embodiment of the present disclosure. As shown in FIG. 5, the audio signal adapter device comprises a loudspeaker interface (such as the headphone plug shown in FIG. 5) and a USB adapter interface (such as the USB plug shown in FIG. 5).

The headphone plug is configured to be connected with a headphone jack of an audio signal sending device (e.g., a mobile phone), to receive an audio signal output from the audio signal sending device and to output a signal to the audio signal sending device.

The headphone plug has an audio pin (such as the AUDIO pin shown in FIG. 5), a MIC pin and a ground pin.

The USB plug is configured to be connected with a USB socket of an audio signal receiving device, to output the audio signal to the audio signal receiving device and to receive the signal output from the audio signal receiving device.

The USB plug has a power pin (a VBUS pin), a D+ pin, a D− pin and a ground pin.

In this embodiment, the audio pin of the headphone plug is connected with the D+ pin of the USB plug, and the ground pin of the headphone plug is connected with the D− pin of the USB plug. In other words, in this embodiment, the audio signal adapter device uses the D+ pin of the USB plug as an audio signal pin and uses the D− pin as a reference signal pin, so as to output the audio signal to the audio signal receiving device.

Furthermore, the MIC pin of the headphone plug is connected with the ground pin of the USB plug.

Alternatively, the MIC pin of the headphone plug may be connected with the ground pin of the USB plug via a direct current isolation unit. In other words, one end of the direct current isolation unit is connected with the MIC pin of the headphone plug, and the other end of the direct current isolation unit is connected with the ground pin of the USB plug, so as to isolate the direct level.

In this embodiment, the direct current isolation unit comprises a capacitor C1.

Figure 6:
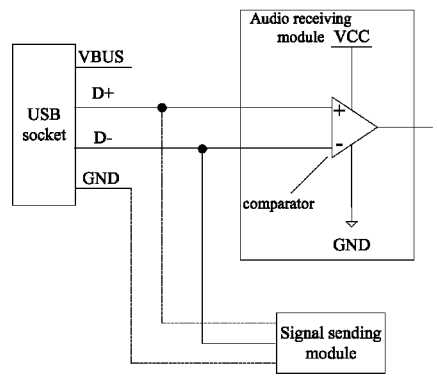
FIG. 6 is a schematic diagram of an audio signal receiving device according to the fourth embodiment of the present disclosure.

FIG. 6 is a schematic diagram of an audio signal receiving device according to the fourth embodiment of the present disclosure. As shown in FIG. 6, the audio signal receiving device comprises a USB interface (such as the USB socket shown in FIG. 6), an audio receiving module and a signal sending module.

The USB socket has a VBUS pin, a D+ pin, a D− pin and a ground pin.

The VBUS pin of the USB socket is configured to supply power for the audio signal receiving device.

In this embodiment, the audio receiving module is connected with the D+ pin and the D− pin of the USB socket, and configured to use the D+ pin as an audio signal pin and use the D− pin as a reference signal pin, so as to receive the audio signal.

The signal sending module can output the signal via one of the D+ pin and the D− pin used as the reference signal pin. The signal sending module in this embodiment outputs the signal via the D− pin.

Alternatively, the signal sending module is connected with the D+ pin and the D− pin of the USB socket respectively, and configured to output the signal by changing the electric levels both of the D+ pin and the D− pin with the same amount simultaneously.

Furthermore, the signal sending module may also be connected with the ground pin of the USB socket, and configured to keep the voltage of the ground pin of the USB socket at a preset fixed voltage. In other words, the ground pin of the USB socket is used as the reference signal pin for the D− pin, so as to output the signal differentially.

It should be noted that, as the audio receiving module recognizes the audio signal according to the difference between voltages of the D+ pin and the D− pin of the USB socket, such that, in this embodiment, when the signal sending module outputs a signal by changing the electric levels of the D+ pin and the D− pin with the same amount simultaneously, the audio signal receiving of the audio receiving module will not be influenced. When it is not necessary to consider whether the receiving of the audio receiving module is influenced (for example, when the audio receiving module stops receiving the audio signal), the signal sending module can output a signal normally as long as it changes the electric level of the D− pin (the reference signal pin of the audio signal receiving end) and keeps the voltage of the ground pin at the preset fixed voltage.

The system for transmitting the audio signal according to the fourth embodiment of the present disclosure comprises the above audio signal adapter device and the above audio signal receiving device.

Fifth Embodiment

Figure 7:
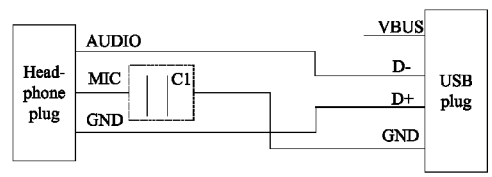
FIG. 7 is a schematic diagram of an audio signal adapter device according to a fifth embodiment of the present disclosure.

FIG. 7 is a schematic diagram of an audio signal adapter device according to the fifth embodiment of the present disclosure. As shown in FIG. 5, the differences between the audio signal adapter devices in the fifth embodiment and that in the fourth embodiment are as follows.

In the fifth embodiment, the audio signal adapter device uses the D− pin of the USB plug as the audio signal pin for connecting with the audio pin of the headphone plug, and uses the D+ pin as the reference signal pin for connecting with the ground pin of the headphone plug.

Figure 8:
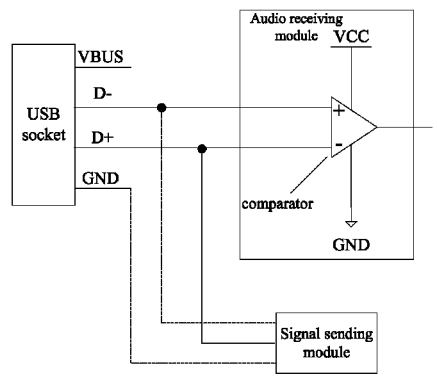
FIG. 8 is a schematic diagram of an audio signal receiving device according to the fifth embodiment of the present disclosure.

FIG. 8 is a schematic diagram of an audio signal receiving device according to the fifth embodiment of the present disclosure. As shown in FIG. 6, the differences between the audio signal receiving devices in the fifth embodiment and that in the fourth embodiment are as follows.

In the fifth embodiment, the audio receiving module uses the D− pin of the USB socket as the audio signal pin and uses the D+ pin as the reference signal pin, so as to receive the audio signal. Moreover, the signal sending module outputs the signal via the D+ pin.

Alternatively, the signal sending module is connected with the D+ pin and the D− pin of the USB socket respectively, and configured to output the signal by changing the electric levels of the D+ pin and D− pin with the same amount simultaneously.

Furthermore, the signal sending module may also be connected with the ground pin of the USB socket, and configured to keep the voltage of the ground pin of the USB socket at a preset fixed voltage. In other words, the ground pin of the USB socket is used as the reference signal pin for the D+ pin, so as to output the signal differentially.

The system for transmitting the audio signal according to the fifth embodiment of the present disclosure comprises the above audio signal adapter device and the above audio signal receiving device.

Certainly, according to the basic principle of the present disclosure, the loudspeaker interface of the audio signal adapter device in the above embodiments may be replaced with other types of audio interfaces which having an audio pin (a left-channel pin, a right-channel pin, a mono pin) and a ground pin (a reference signal pin).

Furthermore, the audio interface of the audio signal adapter device can be fixed connected with the audio signal sending device.

The audio interface of the audio signal adapter device may comprise a plurality of plugs, such as an audio signal plug having an audio signal input pin and a MIC plug having a MIC pin.

Figure 9:
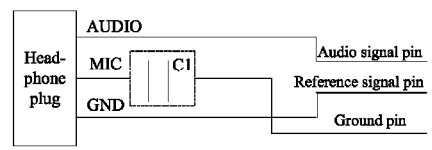
FIG. 9 is a schematic diagram of an audio signal adapter device using other kind of adapter end interfaces except the USB interface according to the present disclosure.
Figure 10:
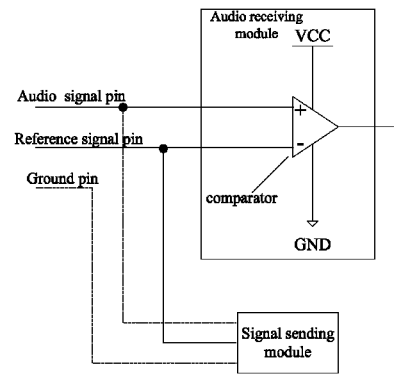
FIG. 10 is a schematic diagram of an audio signal receiving device using other kind of receiving end interfaces except the USB interface according to the present disclosure.

Furthermore, as shown in FIG. 9 and FIG. 10, the audio signal adapter device and the audio signal receiving device may be connected via other adapter end interfaces and receiving end interfaces that having an audio signal pin, a reference signal pin and a ground pin.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A system for transmitting an audio signal, configured to receive the audio signal output from an audio signal sending device and send a signal thereto, and comprising an audio signal adapter device and an audio signal receiving device, wherein
the audio signal adapter device comprises an audio interface and an adapter end interface;
the audio interface is connected with the audio signal sending device and has a first ground pin and at least one audio pin;
the adapter end interface is connected with the audio signal receiving device and has a first audio signal pin and a first reference signal pin;
the at least one audio pin of the audio interface is connected with the first audio signal pin of the adapter end interface, and the first ground pin of the audio interface is connected with the first reference signal pin of the adapter end interface;
the audio signal receiving device comprises an audio receiving module and a receiving end interface;
the receiving end interface has a second audio signal pin and a second reference signal pin, the second audio signal pin of the receiving end interface is connected with the first audio signal pin of the adapter end interface, and the second reference signal pin of the receiving end interface is connected with the first reference signal pin of the adapter end interface; and
the audio receiving module is connected with the second audio signal pin and the second reference signal pin of the receiving end interface respectively, and configured to receive the audio signal via the second audio signal pin and the second reference signal pin;
wherein each of the adapter end interface and the receiving end interface is a USB interface;
the first audio signal pin is one of a D+ pin and a D− pin of the adapter end interface, and the first reference signal pin is the other one of the D+ pin and the D− pin of the adapter end interface; and
the second audio signal pin is one of a D+ pin and a D− pin of the receiving end interface, and the second reference signal pin is the other one of the D+ pin and the D− pin of the receiving end interface.

2. The system according to claim 1, wherein
the audio interface of the audio signal adapter device further comprises a MIC pin;
the adapter end interface of the audio signal adapter device further comprises a second ground pin;
the MIC pin is connected with the second ground pin of the adapter end interface;
the audio signal receiving device further comprises a signal sending module; and
the signal sending module is connected with the second reference signal pin and configured to output a signal to the audio signal sending device via the second reference signal pin and the MIC pin by changing a voltage of the second reference signal pin.

3. The system according to claim 2, wherein the signal sending module is further connected with the second audio signal pin, and configured to change a voltage of the second audio signal pin with an amount same as a change of the voltage of the second reference signal pin.

4. The system according to claim 3, wherein the signal sending module is further connected with a third ground pin of the receiving end interface, and configured to keep a voltage of the third ground pin at a fixed preset voltage when changing the voltage of the second reference signal pin.

5. The system according to claim 1, wherein
the audio receiving module comprises a comparator;
a positive terminal of the comparator is connected with the second audio signal pin, a negative terminal of the comparator is connected with the second reference signal pin, and an output pin of the comparator is configured to output a square wave corresponding to an input audio signal; or
the positive terminal of the comparator is connected with the second reference signal pin, the negative terminal of the comparator is connected with the second audio signal pin, and the output pin of the comparator is configured to output the square wave corresponding to the input audio signal.

6. The system according to claim 1, wherein the at least one audio pin of the audio interface of the audio signal adapter device comprise a left-channel pin and a right-channel pin.

7. An audio signal adapter device, comprising an audio interface and an adapter end interface, wherein
the audio interface is connected with an audio signal sending device and has a first ground pin and at least one audio pin;
the adapter end interface is connected with the audio signal receiving device and has an audio signal pin and a reference signal pin;
the at least one audio pin of the audio interface is configured to receive an audio signal output from the audio signal sending device and connected with the audio signal pin of the adapter end interface, and the first ground pin of the audio interface is connected with the reference signal pin of the adapter end interface; and
the audio signal pin and the reference signal pin are configured to output the audio signal to the audio signal receiving device connected therewith;
the adapter end interface is a USB interface; and
the audio signal pin is one of a D+ pin and a D− pin of the adapter end interface, the reference signal pin is the other one of the D+ pin and the D− pin of the adapter end interface.

8. The audio signal adapter device according to claim 7, wherein,
the audio interface further comprises a MIC pin, and the adapter end interface further comprises a second ground pin; and
the MIC pin is connected with the second ground pin.

9. The audio signal adapter device according to claim 7, wherein
the at least one audio pin of the audio interface comprises a left-channel pin and a right-channel pin.

10. An audio signal receiving device, comprising an audio receiving module and a receiving end interface, wherein
the receiving end interface has an audio signal pin and a reference signal pin, and the audio receiving module is connected with the audio signal pin and the reference signal pin of the receiving end interface, and configured to receive an audio signal via the audio signal pin and the reference signal pin;
the audio signal receiving device further comprises a signal sending module, and the signal sending module is connected with the reference signal pin, and configured to output a signal to an audio signal sending device via the reference signal pin by changing a voltage of the reference signal pin;
the receiving end interface is a USB interface; and the audio signal pin is one of a D+ pin and a D− pin of the receiving end interface, the reference signal pin is the other one of the D+ pin and the D− pin of the receiving end interface.

11. The audio signal receiving device according to claim 10, wherein
the signal sending module is further connected with the audio signal pin, and configured to change a voltage of the audio signal pin with an amount same as a change of the voltage of the reference signal pin.

12. The audio signal receiving device according to claim 11, wherein
the signal sending module is further connected with a ground pin of the receiving end interface, and configured to keep a voltage of the ground pin at a fixed preset voltage when changing the voltage of the reference signal pin.

13. The audio signal receiving device according to claim 10, wherein
the audio receiving module comprises a comparator; and
a positive terminal of the comparator is connected with a D+ pin of the receiving end interface, a negative terminal of the comparator is connected with a D− pin of the receiving end interface, and an output pin of the comparator is configured to output a square wave corresponding to an input audio signal; or the positive terminal of the comparator is connected with the D− pin of the receiving end interface, the negative terminal of the comparator is connected with the D+ pin of the receiving end interface, and the output pin of the comparator is configured to output the square wave corresponding to the input audio signal.

* * * * *